United States Patent [19]

Cismas

[11] Patent Number: 5,574,661
[45] Date of Patent: Nov. 12, 1996

[54] SYSTEM AND METHOD FOR INVERSE DISCRETE COSINE TRANSFORM IMPLEMENTATION

[75] Inventor: Sorin C. Cismas, Sunnyvale, Calif.

[73] Assignee: CompCore Multimedia, Inc., Sunnyvale, Calif.

[21] Appl. No.: 282,947

[22] Filed: Jul. 29, 1994

[51] Int. Cl.[6] .................................... H04L 12/00
[52] U.S. Cl. ................. 364/514 R; 364/715.02; 348/568; 395/114
[58] Field of Search ......................... 364/514 R, 715.02, 364/725; 348/420, 568; 395/114, 115; 370/42, 61

[56] References Cited

U.S. PATENT DOCUMENTS

| 5,394,349 | 2/1995 | Eddy | 364/725 |
| 5,471,412 | 11/1995 | Shyu | 364/725 |

FOREIGN PATENT DOCUMENTS 62-61159  3/1987  Japan .

OTHER PUBLICATIONS

C. Loeffler et al., "Practical Fast 1-D DCT Algorithms with 11 Multiplications," *Proceedings of IEEE ICASSP* vol. 3 pp. 988–991, Feb. 1989.

E. Linzer et al., "New Scaled DCT Algorithms for Fused Multiply/Add Architectures," *Proceedings of IEEE ICASSP* pp. 2201–2204, 1991.

Y. Arai et al., "A Fast DCT-SQ Scheme for Images," *The Transactions of the IEICE,* vol. E71, No. 11, pp. 1095–1097, Nov. 1988.

ISO, *Coding of Moving Pictures and Associated Audio for Digital Storage Media at up to About 1.5 Mbit/s,* Part 2 Video, 1991.

*Primary Examiner*—Ellis B. Ramirez
*Assistant Examiner*—Thomas Peeso
*Attorney, Agent, or Firm*—Fish & Richardson P.C.

[57] ABSTRACT

An apparatus and method for calculation of the inverse discrete cosine transform for image decompression are disclosed. The apparatus may be implemented with approximately 10,000 transistors for MPEG2 main level speed and with less than 10,000 transistors for MPEG1 main level speed.

22 Claims, 5 Drawing Sheets

SYSTEM AND METHOD FOR INVERSE DISCRETE COSINE TRANSFORM IMPLEMENTATION

BACKGROUND OF THE INVENTION

The present invention relates generally to image decompression, and more particularly to a system and method for evaluation of an inverse discrete cosine transform as part of image decompression.

Most images that are to be conveyed or stored electronically have spatial redundancy due to a degree of spatial periodicity and limited spatial variation, whereby many spatial frequency components are close to zero. Pictures (static images or frames of moving images), represented using any color space and possibly motion compensated and predictively coded, may be compressed by performing a frequency transformation followed by quantization, and some form of entropy coding, usually Huffman or arithmetic coding.

Spatial frequency domain representation of pictures using 8×8, 2-dimensional discrete cosine transforms has become standard. This technique is used, for example, by the Joint Photographic Experts Group (JPEG) standard for still pictures, the Px64 standard for H.261 videoconferencing, the Motion Picture Experts Group (MPEG)-1 standard for PC based multimedia and hand-held video games, and the MPGE-2 standard for digital cable television. The picture is represented as arrays of picture elements (pels) characterized by a (possibly predictively coded) quantity such as luminance, chrominance, or a motion vector. The arrays are divided into 8 by 8 blocks of pel values, and each block is converted to an 8 by 8 matrix of horizontal and vertical spatial frequency coefficients.

When the resulting coefficients are quantized, most of the medium to high frequency coefficients yield zero values. The coefficients are ordered generally in the order of increasing spatial frequency, resulting in clusters of nonzero coefficients early in the series followed by runs of consecutive zero values. Such a data stream can be significantly compressed using statistical encoding.

When the image is decompressed, each 8 by 8 matrix of spatial frequency coefficients is converted into an 8-by-8 block of pel values by performing the two-dimensional inverse discrete cosine transform (IDCT). The two-dimensional IDCT is separable into a cascade of one-dimensional IDCTs performed first along one array dimension and then along the other. For example, each column of coefficients in the original array may be replaced with the corresponding values of their IDCT. The original pel values may then be obtained by replacing each row of resulting values with its IDCT. The 8-by-8, two-dimensional IDCT can thus be decomposed into sixteen one-dimensional, eighth order IDCTs.

It can be seen that the eighth order, one-dimensional IDCT has widespread, usually real-time, applications in image decompression. Considerable effort has gone into producing efficient implementations. Most of the effort has focused on combinatorial implementations, where the delay must be reduced by reducing the number of multiplications and, less importantly, additions. The tradeoff between additions and multiplications results in calculations requiring many more additions than multiplications, and rather large total numbers of operations. Such calculations for IDCT or discrete cosine transforms (DCT) are disclosed in "Practical Fast 1-D IDCT Algorithms with 11 Multiplications," Christoph Loeffler, Adriaan Ligtenberg and George S. Moschytz, *Proceedings. of IEEE ICASSP* vol. 2 pp. 988–991, February 1989 and "A Fast DCT-SQ Scheme for Images," Yukihiro Arai, Takeshi Agui and Masayuki Nakajima, *The Transactions of the IEICE*, vol. E71, no. 11, pp. 1095–1097, November 1988.

While the combinatorial implementations are fast, they require a large amount of hardware since different devices are required for each operation. All two-dimensional IDCT implementations require a memory for the transpose operation between the column and row one-dimensional IDCTs. This memory could also be used to hold intermediate results as the IDCTs are computed by a sequential logic circuit, such as a multiply accumulate together with a modest amount of auxiliary logic. As is well known, a multiply accumulate comprises a multiplier and an adder, with the multiplier output connected to an adder input. With this less expensive hardware, the fastest calculation requires the fewest number of steps having at most one multiplication, where necessary steps having additions but no multiplications offer no advantage over steps that also include a multiplication.

A method for hardware implementation using fused multiply/add operations is disclosed in "New Scaled DCT Algorithms for Fused Multiply/Add Architectures," Elliot Linzer and Ephraim Feig, *Proceedings of the IEEE ICASSP*, pp. 2201–2204, 1991. However, both this method and the one disclosed in Arai et al. mentioned above yield results that are the IDCT results multiplied by a scale factor. While it is possible to account for these scale factors in the image processing quantizing matrix, this technique is only practical with software implementations. In hardware implementations additional multipliers and memory would be necessary. However, this additional hardware is not necessary if the final scaling is by a power of 2, in which case a shift of the bits of the results can be used. In order for the final scaling of the results of a 2-dimensional IDCT to be by a power of 2, the results of the 1-dimensional IDCTs must be off by a factor equal to the square root of the power of 2.

Accordingly, an object of the present invention is to provide a system and method for image decompression wherein the hardware for non-scaled, 2-dimensional IDCT computation requires only one multiplier and the IDCT computation is performed in fewer steps than was heretofore possible.

Another object of the present invention is to provide a simplified system for 8-by-8, 2-dimensional IDCT computation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a method for picture decompression. A compressed picture definition, digital signal is input and digitally processed using a signal processor to generate a spatially redundant, picture definition, digital signal. The processing steps include performing an evaluation of a plurality of 2-dimensional, 8-point-by-8-point IDCTs. Each evaluation includes sixteen evaluations of a scaled eight-point, one-dimensional IDCT, scaled by a factor equal to the square root of a power of two. After the evaluations of the scaled one-dimensional IDCT are performed, the results are shifted by a number of bits equal to the above-mentioned power of two. The spatially redundant, picture definition, digital signal is output for use in rendering a display.

If the starting one-dimensional discrete cosine transform (DCT) values are F(0)–F(7) and the scaled one-dimensional IDCT values are f'(0)–f'(7), the scaled one-dimensional IDCT calculation is performed as follows. Specifically, the following values are calculated: an intermediate value $P_0$ equal to about F(0)+F(4), an intermediate value $P_1$ equal to about F(0)–F(4), an intermediate value $P_2$ equal to about F(2)+$k_1$F(6) wherein $k_1$ is about $2^{1/2}$–1, an intermediate value $P_3$ equal to about F(2)–$k_2$F(6) wherein $k_2$ is about $2^{1/2}$+1, an intermediate value $P_4$ equal to about F(1)+$k_3$F(7) wherein $k_3$ is about $2^{1/2}(2+2^{1/2})^{1/2}-2^{1/2}-1$, an intermediate value $P_5$ equal to about F(1)–$k_4$F(7) wherein $k_4$ is about $2^{1/2}(2+2^{1/2})^{1/2}+2^{1/2}+1$, an intermediate value $P_6$ equal to about F(5)+$k_5$F(3) wherein $k_5$ is about $2^{1/2}(2-2^{1/2})^{1/2}+2^{1/2}-1$, an intermediate value $P_7$ equal to about F(5)–$k_6$F(3) wherein $k_6$ is about $2^{1/2}(2-2^{1/2})^{1/2}-2^{1/2}+1$, an intermediate value $Q_0$ equal to about $P_0+k_7P_2$ wherein $k_7$ is about $2\frac{1}{2}(2+2^{1/2})^{1/2}$, an intermediate value $Q_2$ equal to about $P_0-k_7P_2$, an intermediate value $Q_1$ equal to about $P_1+k_8P_3$ wherein $k_8$ is about $2^{-\frac{1}{2}}(2-2^{1/2})^{1/2}$, an intermediate value $Q_3$ equal to about $P_1-k_8P_3$, an intermediate value $Q_4$ equal to about $P_4+k_9P_6$ wherein $k_9$ is about $-(2+2^{1/2})^{1/2}+2^{1/2}+1$, an intermediate value $Q_6$ equal to about $P_4-k_9P_6$, an intermediate value $Q_5$ equal to about $P_5+k_{10}P_7$ wherein $k_{10}$ is about $(2+2^{1/2})^{1/2}+2^{1/2}+1$, an intermediate value $Q_7$ equal to about $P_5-k_{10}P_7$, an intermediate value $R_6$ equal to about $Q_6+k_3Q_7$, an intermediate value $R_7$ equal to about $Q_6-k_3Q_7$, value f'(0) equal to about $Q_0+k_{11}Q_4$ wherein $k_{11}$ is about $2^{-\frac{1}{2}}(2+(2+2^{1/2})^{1/2})^{1/2}$, value f'(7) equal to about $Q_0-k_{11}Q_4$, value f'(1) equal to about $Q_1+k_{12}R_6$ wherein $k_{12}$ is about $(\frac{1}{2})(2+(2+2^{1/2})^{1/2})^{1/2}$, value f'(6) equal to about $Q_1-k_{12}R_6$, value f'(3) equal to about $Q_2+k_{13}Q_5$ wherein $k_{13}$ is about $2^{-\frac{1}{2}}(2-(2+2^{1/2})^{1/2})^{1/2}$, value f'(4) equal to about $Q_2-k_{13}Q_5$, value f'(2) equal to about $Q_3+k_{12}R_7$, and value f'(5) equal to about $Q_3-k_{12}R_7$.

The system of the present invention includes a butterfly computation subsystem having a first input, a second input, and an output. A memory having a write port and a read port has its write port connected to the output of the butterfly computation subsystem by a first signal path. The system also includes a multiplexer having first and second inputs, and an output connected to the first input of the butterfly computation subsystem by a second signal path. A third signal path connects the read port of the memory to the first input of the multiplexer. A controller provides read and write addresses, and a write enable signal to the memory. The controller also controls the multiplexer and supplies coefficient values to a second input of the butterfly computation subsystem in order to compute a 2-dimensional, 8-point-by-8-point IDCT, including sixteen evaluations of a scaled eight point, one-dimensional inverse discrete cosine transform as described in the above paragraph.

BRIEF DESCRIPTION OF THE DRAWINGS

The accompanying drawings, which are incorporated in and constitute a part of the specification, and wherein like reference numerals identify like elements, schematically illustrate a preferred embodiment of the invention and, together with the general description given above and the detailed description of the preferred embodiment given below, serve to explain the principles of the invention.

DESCRIPTION OF THE PREFERRED EMBODIMENTS

The present invention will be described in terms of several preferred embodiments. The preferred embodiments are systems and methods for determining the IDCT. A flow graph 10 of a scaled, one-dimensional IDCT determination according to the present invention is shown in FIG. 1.

Figure 1:
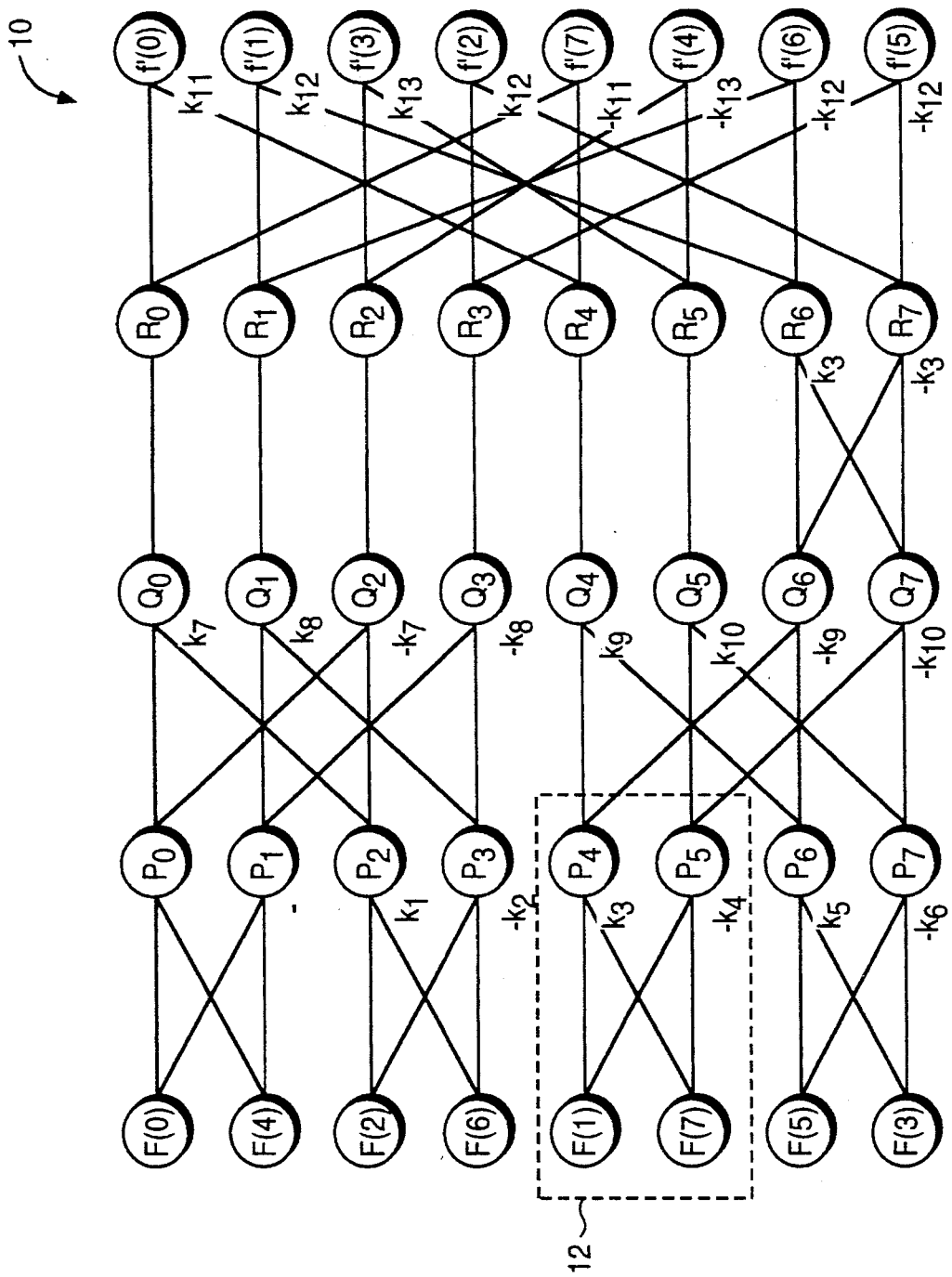
FIG. 1 is a flow diagram of the scaled 1-dimensional IDCT calculation according to the present invention.

FIG. 1 illustrates thirteen butterflies. As is well known, a butterfly is the determination of two quantities which are both linear combinations of two other known quantities, the same two known quantities for both of the quantities being determined. For example, butterfly step 12 (enclosed by a rectangular box in phantom) consists of the determination of quantities $P_4=F(1)+k_3F(7)$ and $P_5=F(1)-k_4F(7)$. Of the thirteen butterflies of FIG. 1, one butterfly (the determination of the $P_0$, $P_1$ pair) has one addition and one subtraction; nine butterflies have one multiplication, one addition and one subtraction (the determination of the $Q_0$, $Q_2$ pair, the $Q_1$, $Q_3$ pair, the $Q_4$, $Q_6$ pair, the $Q_5$, $Q_7$ pair, the $R_6$, $R_7$ pair, the f'(0), f'(7) pair, the f'(1), f'(6) pair, the f'(3), f'(4) pair and the f'(2), f'(5) pair), and there are three butterflies with two multiplications, one addition and one subtraction (butterfly 12 and the determination of the $P_2$, $P_3$ pair and of the $P_6$, $P_7$ pair). Each of the last three butterflies can be decomposed into two butterflies of the second category, that is, butterflies having one multiplication, one addition and one subtraction. If the butterflies are limited to at most one multiplication step, the method of FIG. 1 requires sixteen such butterflies. Therefore the computation of the two-dimensional (2D) IDCT requires 16×16=256 butterflies, each butterfly being one multiplication, one addition and one subtraction.

Unlike other IDCT determinations where the multiplications are concentrated in some areas of the flow graph, the method of the present invention offers the advantage that all the operations (butterflies) are about of the same complexity and are distributed throughout the flow graph. For hardware implementations, this results in a simple data path with an arithmetic unit that always does the same type of operation. The hardware components can be used concurrently most of the time, meaning there is little waste. Therefore the use of this method can lead to very small and efficient IDCT implementations.

Figure 2:
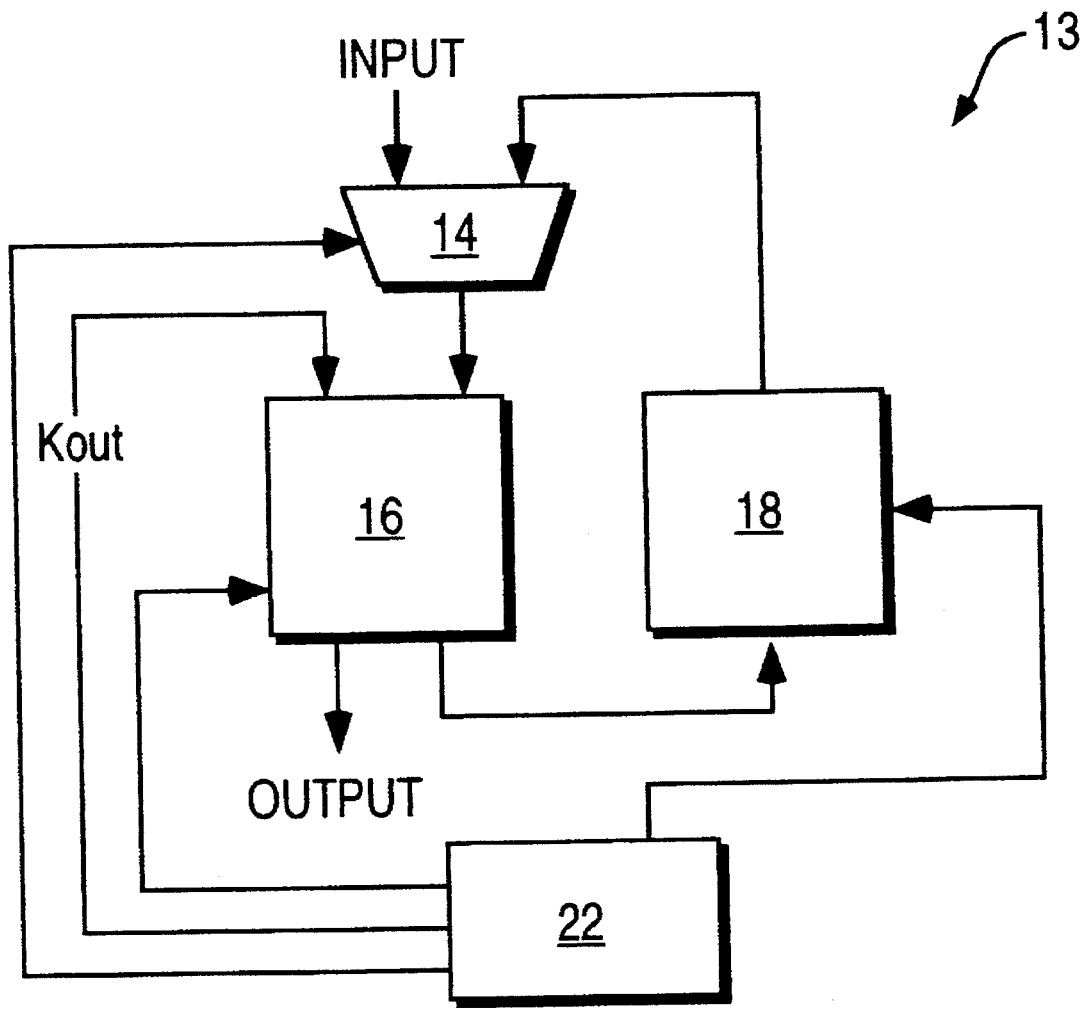
FIG. 2 is a block diagram of a system for calculating the IDCT according to the present invention.

As shown in FIG. 2, the IDCT determination system 13 of the present invention comprises a controller 22, a multiplexer 14, butterfly computation subsystem 16, and a memory 18. Controller 22 controls multiplexer 14, memory 18 and butterfly computation subsystem 16, and provides k coefficients to butterfly computation subsystem 16 using signal KOUT. Multiplexer 14 has an output connected to butterfly computation subsystem 16, an input which serves as the input of the IDCT determination system 13, and an input connected to a read port of memory 18. Butterfly computation subsystem 16 has an output which serves as the output of the IDCT determination system 13 and another output connected to a write port of memory 18. As mentioned above, the memory is required in any 2D IDCT implementation for the transpose operation between the column and row IDCTs. As will be described below, in the implementation of the present invention, the transpose operation may be reduced to row and column address exchange done by a multiplexer. In the present invention, the one-dimensional (1D) IDCT is preferably computed first on columns and then on rows. In this way, the IDCT output is line-by-line instead of column-by-column, making it simpler to interface to other functional units of the image decompressor connected to the output of IDCT determination system 13 (not shown). The same memory 18 may be used also for temporary storage of the butterfly results saving eight registers. The IDCT implementation of the present invention has a simple structure and the data flow is very localized. This leads to a very simple layout that can be also counted as an additional silicon area saving.

Assuming 12 bits signed butterfly input (the two initial values which are supplied by multiplexer 14 in FIG. 2) and 9 bits signed butterfly output (the two final values output by butterfly calculation subsystem 16 in FIG. 2), it can be demonstrated that all values of the butterfly output are in the range [−10456, 10456]. After extensive simulation, the best compromise between accuracy and data path width has been found to be 16 bits for the memory 18 and 13 bits for the k coefficients (signal KOUT in FIG. 2). The 12 bit input is left shifted one position. As a result, all butterfly outputs are in the range [−20912, 20912] so all data (input, intermediate results and output) can be represented by 16 bit integers. The final output should be right shifted by 4 positions, one because of the input shifting and three because of the scaling required by this method. The decimal floating point, hex fixed point and binary fixed point representation of the 13-bit k coefficients (k[1] through k[13]) is shown in Table 1 below. In Table 1, the last column is used below in the discussion of a k block of controller 22.

TABLE 1 k coefficients and rounding

| k coefficient | decimal - floating point | hex - fixed point | binary - fixed point | (RDCNT-1) [4:1] |
|---|---|---|---|---|
| k[1]  | 0.414213562 | 0.6a09e66 | 000.0110101000 | 0101 |
| k[2]  | 2.414213562 | 2.6a09e66 | 010.0110101000 | 0110 |
| k[3]  | 0.198912367 | 032ebebc  | 000.0011001100 | 0011, 1011 |
| k[4]  | 5.027339492 | 5.06ffb89 | 101.0000011100 | 0100 |
| k[5]  | 1.496605763 | 1.7f218e2 | 001.0111111101 | 0001 |
| k[6]  | 0.668178638 | 0.ab0dc15 | 000.1010101100 | 0010 |
| k[7]  | 1.306562965 | 1.4e7ae91 | 001.0100111010 | 1001 |
| k[8]  | 0.541196100 | 0.8a8bd3d | 000.1000101010 | 1010 |
| k[9]  | 0.566454497 | 0.9103297 | 000.1001000100 | 0111 |
| k[10] | 4.261972627 | 4.4310a35 | 100.0100001100 | 1000 |
| k[11] | 1.387039845 | 1.63150b1 | 001.0100001100 | 1100 |
| k[12] | 0.980785280 | 0.fb14be7 | 000.1111101100 | 1101, 1110 |
| k[13] | 0.275899379 | 0.46a1577 | 000.0100011011 | 1111 |
| k[0] = 1 | 1.000000000 | 1.0000000 | 001.0000000000 | 0000 |

The rounding errors for such an IDCT implementation, computed according to the IEEE Standard Specifications for the Implementation of 8×8 Inverse Discrete Cosine Transform, IEEE Std 1180-1990, Dec. 6, 1990 are shown in the second column of Table 2. In Table 2, the third column gives the IEEE recommendations for the errors.

TABLE 2

IDCT rounding errors

| Error Type | Error | IEEE |
|---|---|---|
| ppe (Pixel Peak Error) | 1 | 1 |
| pmse (Pixel Mean Square Error) | 0.2357 | 0.06 |
| omse (Overall Mean Square Error) | 0.1335 | 0.02 |
| pme (Pixel Mean Error) | 0.0127 | 0.015 |
| ome (Overall Mean Error) | 0.0009 | 0.0015 |
| all-zero input all-zero output | YES | YES |

The description of two particular IDCT implementations according to the present invention follows. The first one 13a (FIG. 3) is for low-end type applications like Px64 and MPEG1, and the second 13b (FIG. 5) is for medium complexity applications like digital TV (MPEG2 main level). The main differences between these two implementations are in the way the butterfly calculation is implemented.

Figure 3:
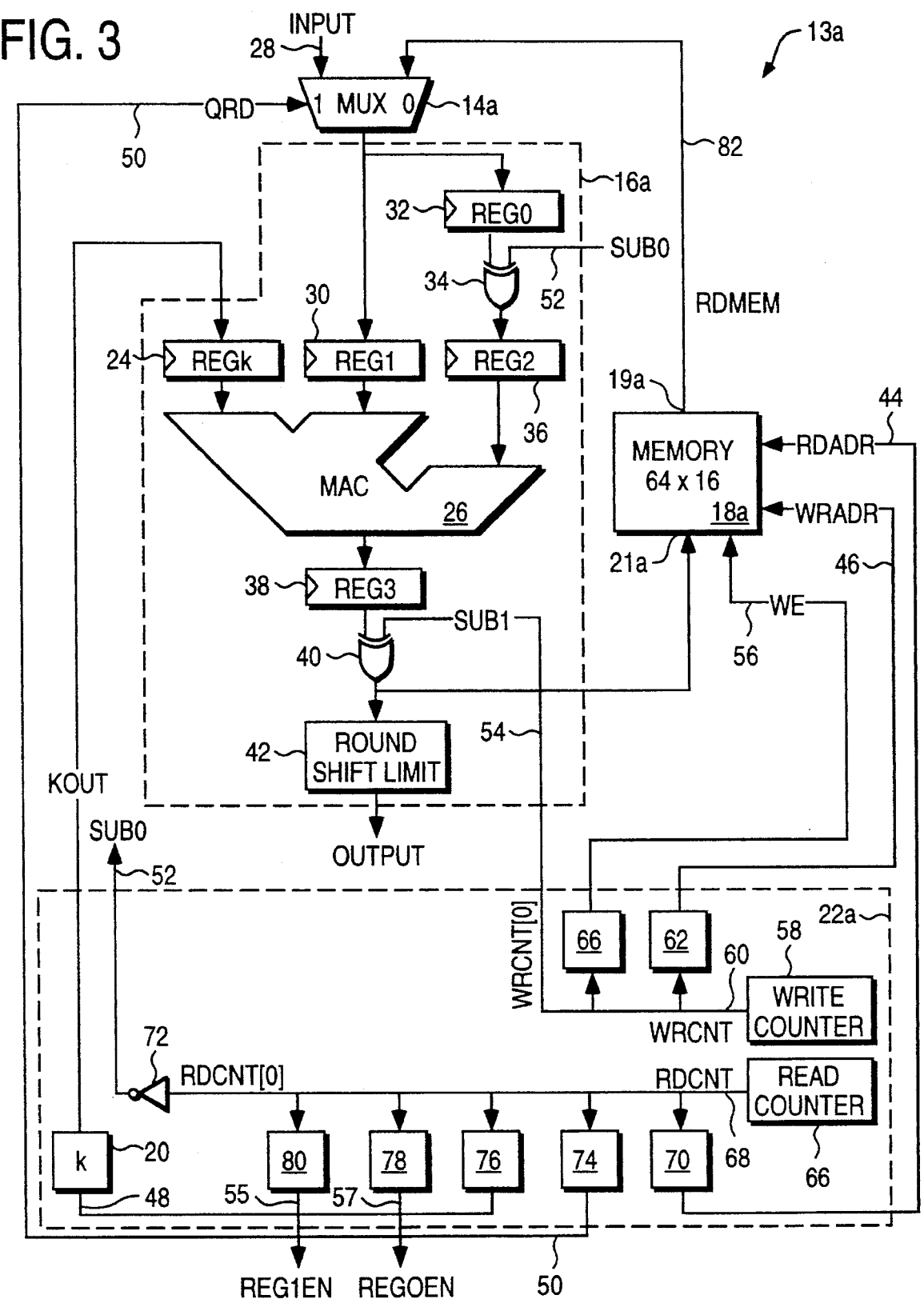
FIG. 3 is a detailed block diagram of a system for calculating the IDCT according to the present invention.

For Px64 or MPEG1 source input format (SIF) resolution (352 by 240×30 frames or 352 by 288×25 frames), there are 59,400 IDCTs to be computed in one second. Assuming a reasonable clock speed of 33 MHz, there are approximately 512 cycles available to compute a bidimensional IDCT of an 8-by-8 block. This means there are two cycles to compute one butterfly. This could be done with a two cycle multiplier followed by an adder that one cycle adds and the other subtracts. Using a single cycle multiply accumulate (MAC), however, makes not only the implementation simpler but also reduces the total gate count. The MAC is used one cycle to multiply-add and the other one to multiply-subtract. The multiply-subtract can use a multiply-add operation in the following way:

$$a - kb = -((-a-1) + kb) - 1 = \overline{\overline{a} + kb} \tag{1}$$

where $\overline{a}$ is the one complement of a. The block diagram of the implementation is shown in FIG. 3.

The data path is 16 bits wide so it can carry one data value at a time. Memory 18a, which is a particular embodiment of memory 18 of FIG. 2, is dual ported (with one read port 19a and one write port 21a) and has 64 16-bit memory locations, with the three least significant bits of the address specifying the column and the following three bits specifying the row. The k coefficients are held in register (REGk) 24, whose output is connected to a multiplier input of MAC 26. One input of multiplexer 14a, which is a particular embodiment of multiplexer 14 of FIG. 2, receives input signal 28 from the image decompressor (not shown), and the other input of multiplexer 14a is connected to memory 18a. The output of multiplexer 14a is fed to registers 30 (REG1) and 32 (REG0). The output of register 30 is connected to the other multiplier input of MAC 26. The output of register 32 is fed, through a set of XOR gates 34, to a register 36 (REG2). The output of register 36 is connected to the adder input of MAC 26. The output of MAC 26 is fed to a register 38 (REG3). The output of register 38 passes through another set of XOR gates 40 and is then applied to the write port of memory 18a and to round shift limit element 42. The sets of XOR gates 34 and 40 perform the one's complement operation of equation (1).

Round shift limit element 42 right shifts its input by four positions as discussed above. Before shifting, it does an unbiased rounding by adding 8 for positive and 7 for negative numbers. The result is right shifted and limited to the [−256, 255] interval. The resulting output is the output of system 13a. This logic takes 220 transistors.

MAC 26 has a 13 bit unsigned input for the k coefficients (3 before and 10 after the binary (radix) point and two 16 bit signed inputs. In the most general case, the MAC output to register 38 could be 29 bit signed (19 before and 10 after the binary point). Because all butterfly outputs are in the range [−20912, 20912], the 3 most significant bits can be dropped because they are always equal to the fourth most significant bit. The 10 least significant bits (those after the binary point) can also be dropped if a simple rounding is done by adding 0.5 to all results. This dropping of 13 bits significantly simplifies the MAC structure. Using a modified Booth algorithm, as well known in the art, 8 partial products must be added (seven from the k coefficients and one from the accumulate). It is simplest to use three 4:2:2 compressors for each bit. Using a "sign-generate" method for sign extension, only 57 compressors are necessary. Of these, only 35 are actually 4:2 compressors. The other 22 are simplified versions like 3:2 compressors (full adder) or even simpler. Because of all these optimizations, the MAC implementation requires less than 5400 transistors.

Registers 24, 30, 32, 36, and 38, MAC 26, XOR gates 34 and 40 and round shift limit element 42 form an embodiment 16a of butterfly calculation subsystem 16 of FIG. 2.

Besides the data path, a small controller 22a, which is a particular embodiment of controller 22 of FIG. 2, is required to drive addresses RDADR 44 and WRADR 46, provide k coefficients using k block 20 driven using signal 48, provide output control signals QRD 50, SUB0 52 and SUB1 54, memory write enable signal WE 56, and register enable signals REG1EN 55 and REG0EN 57 for registers REG0 32 and REG1 30.

Controller 22a comprises a 9 bit write counter 58 with output signal WRCNT 60. Output signal WRCNT 60 is applied to combinatorial logic 62 which produces address WRADR 46 as discussed in greater detail below. The five least significant bits WRCNT[4:0] of output signal WRCNT 60 are also applied to combinatorial logic 64 which produces the write enable signal 56. The truth table for logic 64 is given by columns WRCNT and WE of Table 3. Signal SUB1 54 is the least significant bit of WRCNT 60.

TABLE 3

Control signals for the first one-dimensional IDCT

| RDCNT | RDADR | WRCNT | WRADR | KOUT | INPUT | RDMEM | QRD |
|---|---|---|---|---|---|---|---|
| 000 | 00 | | | | $F_{00}$ | | 1 |
| 001 | 40 | | | $k_0$ | $F_{40}$ | | 1 |
| 002 | 50 | | | $k_0$ | $F_{50}$ | | 1 |
| 003 | 30 | 000 | 00 | $k_5$ | $F_{30}$ | | 1 |
| 004 | 50 | 001 | 40 | $k_5$ | | | 1 |
| 005 | 30 | 002 | 50 | $k_6$ | | | 1 |
| 006 | 10 | 003 | 30 | $k_6$ | $F_{10}$ | | 1 |
| 007 | 70 | 004 | 50 | $k_3$ | $F_{70}$ | | 1 |
| 008 | 10 | 005 | 30 | $k_3$ | | | 1 |
| 009 | 70 | 006 | 10 | $k_4$ | | | 1 |
| 00a | 20 | 007 | 70 | $k_4$ | $F_{20}$ | | 1 |
| 00b | 60 | 008 | 10 | $k_1$ | $F_{60}$ | | 1 |
| 00c | 20 | 009 | 70 | $k_1$ | | | 0 |
| 00d | 60 | 00a | 20 | $k_2$ | | | 0 |
| 00e | 10 | 00b | 60 | $k_2$ | | $P_{40}$ | 0 |
| 00f | 50 | 00c | 20 | $k_9$ | | $P_{60}$ | 0 |
| 010 | 70 | 00d | 60 | $k_9$ | | $P_{50}$ | 0 |
| 011 | 30 | 00e | 10 | $k_{10}$ | | $P_{70}$ | 0 |
| 012 | 00 | 00f | 50 | $k_{10}$ | | $P_{00}$ | 0 |
| 013 | 20 | 010 | 70 | $k_7$ | | $P_{20}$ | 0 |
| 014 | 40 | 011 | 30 | $k_7$ | | $P_{10}$ | 0 |
| 015 | 60 | 012 | 00 | $k_8$ | | $P_{30}$ | 0 |
| 016 | 50 | 013 | 20 | $k_8$ | | $Q_{60}$ | 0 |
| 017 | 30 | 014 | 40 | $k_3$ | | $Q_{70}$ | 0 |
| 018 | 00 | 015 | 60 | $k_3$ | | $Q_{00}$ | 0 |
| 019 | 10 | 016 | 50 | $k_{11}$ | | $Q_{40}$ | 0 |
| 01a | 40 | 017 | 30 | $k_{11}$ | | $Q_{10}$ | 0 |
| 01b | 50 | 018 | 00 | $k_{12}$ | | $R_{60}$ | 0 |
| 01c | 60 | 019 | 10 | $k_{12}$ | | $Q_{30}$ | 0 |
| 01d | 30 | 01a | 40 | $k_{12}$ | | $R_{70}$ | 0 |
| 01e | 20 | 01b | 50 | $k_{12}$ | | $Q_{20}$ | 0 |
| 01f | 70 | 01c | 60 | $k_{13}$ | | $Q_{50}$ | 0 |
| | | 01d | 30 | $k_{13}$ | | | |
| | | 01e | 20 | | | | |
| | | 01f | 70 | | | | |

| REG0 | SUB0 | REGK | REG1 | REG2 | REG3 | SUB1 | WE |
|---|---|---|---|---|---|---|---|
| $F_{00}$ | 0 | | | | | | |
| " | 1 | $k_0$ | $F_{40}$ | $+F_{00}$ | | | |
| $F_{50}$ | 0 | $k_0$ | " | $-F_{00}$ | $+P_{00}$ | 0 | 1 |
| " | 1 | $k_5$ | $F_{30}$ | $+F_{50}$ | $-P_{10}$ | 1 | 1 |
| " | 0 | $k_5$ | " | $-F_{50}$ | $+P_{60}$ | 0 | 1 |
| " | 1 | $k_6$ | " | $+F_{50}$ | | 1 | 0 |
| $F_{10}$ | 0 | $k_6$ | " | $-F_{50}$ | | 0 | 0 |
| " | 1 | $k_3$ | $F_{70}$ | $+F_{10}$ | $-P_{70}$ | 1 | 1 |
| " | 0 | $k_3$ | " | $-F_{10}$ | $+P_{40}$ | 0 | 1 |
| " | 1 | $k_4$ | " | $+F_{10}$ | | 1 | 0 |
| $F_{20}$ | 0 | $k_4$ | " | $-F_{10}$ | | 0 | 0 |

TABLE 3-continued

Control signals for the first one-dimensional IDCT

|  |  |  |  |  |  |  |  |
|---|---|---|---|---|---|---|---|
| " | 1 | $k_1$ | $F_{60}$ | $+F_{20}$ | $-P_{50}$ | 1 | 1 |
| " | 0 | $k_1$ | " | $-F_{20}$ | $+P_{20}$ | 0 | 1 |
| " | 1 | $k_2$ | " | $+F_{20}$ |  | 1 | 0 |
| $P_{40}$ | 0 | $k_2$ | " | $-F_{20}$ |  | 0 | 0 |
| " | 1 | $k_9$ | $P_{60}$ | $+P_{40}$ | $-P_{30}$ | 1 | 1 |
| $P_{50}$ | 0 | $k_9$ | " | $-P_{40}$ | $+Q_{40}$ | 0 | 1 |
| " | 1 | $k_{10}$ | $P_{70}$ | $+P_{50}$ | $-Q_{60}$ | 1 | 1 |
| $P_{00}$ | 0 | $k_{10}$ | " | $-P_{50}$ | $+Q_{50}$ | 0 | 1 |
| " | 1 | $k_7$ | $P_{20}$ | $+P_{00}$ | $-Q_{70}$ | 1 | 1 |
| $P_{10}$ | 0 | $k_7$ | " | $-P_{00}$ | $+Q_{00}$ | 0 | 1 |
| " | 1 | $k_8$ | $P_{30}$ | $+P_{10}$ | $-Q_{20}$ | 1 | 1 |
| $Q_{60}$ | 0 | $k_8$ | " | $-P_{10}$ | $+Q_{10}$ | 0 | 1 |
| " | 1 | $k_3$ | $Q_{70}$ | $+Q_{60}$ | $-Q_{30}$ | 1 | 1 |
| $Q_{00}$ | 0 | $k_3$ | " | $-Q_{60}$ | $+R_{60}$ | 0 | 1 |
| " | 1 | $k_{11}$ | $Q_{40}$ | $+Q_{00}$ | $-R_{70}$ | 1 | 1 |
| $Q_{10}$ | 0 | $k_{11}$ | " | $-Q_{00}$ | $+f_{00}$ | 0 | 1 |
| " | 1 | $k_{12}$ | $R_{60}$ | $+Q_{10}$ | $-f_{70}$ | 1 | 1 |
| $Q_{30}$ | 0 | $k_{12}$ | " | $-Q_{10}$ | $+f_{10}$ | 0 | 1 |
| " | 1 | $k_{12}$ | $R_{70}$ | $+Q_{30}$ | $-f_{60}$ | 1 | 1 |
| $Q_{20}$ | 0 |  | " | $-Q_{30}$ | $+f_{20}$ | 0 | 1 |
| " | 1 |  |  | $-Q_{30}$ | $-f_{50}$ | 1 | 1 |
| " | 1 | $k_{13}$ | $Q_{50}$ | $+Q_{20}$ | $-f_{50}$ | 1 | 1 |
|  |  | $k_{13}$ | " | $-Q_{20}$ | $+f_{30}$ | 0 | 1 |
|  |  |  |  |  | $-f_{40}$ | 1 | 1 |

Controller 22a also comprises a 9 bit read counter 66 with output signal RDCNT 68. Output signal RDCNT 68 is applied to combinatorial logic 70, which in the preferred embodiment is functionally, equivalent to logic 62, as discussed below, and which produces address signal RDADR 44. Signal SUB0 52 is the least significant bit of signal RDCNT 68 inverted by inverter 72. Signal QRD 50 is produced by combinatorial logic 74 and is a function of the most significant bit and of the five least significant bits of signal RDCNT 68. When RDCNT[8] is 1, signal QRD is always zero. Otherwise, its truth table as a function of signal RDCNT[4:0] is given by columns RDCNT and INPUT of Table 3, where signal QRD is 1 whenever the INPUT column is not blank. Input signal 48 to k block 20 is a four bit input which depends on RDCNT[4:0]. From Table 3 it can be seen that signal KOUT stays the same as signal RDCNT changes from an odd number to the next higher number. Thus input 48 to k block 20 may be synthesized by combinatorial logic 76 simply by decrementing RDCNT [4:0] and discarding the least significant bit. The truth table of k block 20 is given by columns "binary—fixed point" and "(RDCNT–1)[4:1]" of Table 1. Signal REG0EN 57 is a function of RDCNT[4:0] and is produced by combinatorial logic 78. The truth table of logic 78 is given by columns RDCNT and REG0 of Table 3. REG0EN is 0 when the REG0 column contains a blank or double quotation mark, and 1 otherwise. Signal REG1EN 55 is a function of RDCNT[4:0] and is produced by combinatorial logic 80. The truth table of logic 78 is given by columns RDCNT and REG1 of Table 3. REG1EN is 0 when the REG1 column contains a blank or double quotation mark, and is 1 otherwise.

The k block doesn't have to be a read only memory (ROM). A combinatorial block with four bit input (coefficient index) and 13 bit output (k coefficient) may be implemented with 204 transistors.

INPUT signal 28 usually comes from a random access memory (RAM) of the image decompressor and is produced by an inverse quantizer. Signal RDADR 44 may be used to address the RAM so that the input arrives in the order indicated in column INPUT of Table 3, where the second subscript indicates the index of the column being processed. RDMEM signal 82 is the output of memory 18a which is applied to multiplexer 14a.

The 2D IDCT consists of 16 1D IDCTs, each computed in 32 cycles. Table 3 shows how the control signals are driven and what signals are output for the first one-dimensional IDCT (for the first column IDCT of the 8 by 8 matrix). The notations used are the same as in the flow graph of FIG. 1, with a second subscript added to indicate that the first matrix column is being processed. For other matrix columns, the second subscript would be the index of the matrix column, RDCNT and WRCNT would be higher by an amount equal to 32 times the index of the matrix column, and RDADR and WRADR would be given by logic 62 and 70 described below. When the matrix rows are processed, multiplexer 14a selects signal RDMEM instead of INPUT. Signal RDMEM is determined by the matrix column processing previously done and by signal RDADR. Signals RDADR and WRADR are still determined by logic 62 and 70 described below. When a matrix row of a given index is processed, RDCNT and WRCNT are higher by 256 than they were when the same index matrix column was being processed.

The use of the two counters 58 and 66 greatly simplifies the IDCT controller. The IDCT pipeline can be stopped at any stage simply by disabling these counters.

Because the memory is used also as temporary storage for the butterfly intermediate results, there are many constraints on the butterfly processing order. The most restrictive is that after a butterfly computation has started, at least three cycles are needed until the result can be used to compute a new butterfly. The order chosen (REG3 column in Table 3) solves all these constraints and in addition simplifies the control logic (WRADR logic 62 is the same as RDADR logic 70, k coefficient sequence simplifies k block 20, SUB0 and SUB1 are the complement of RDCNT[0]).

Figure 4:
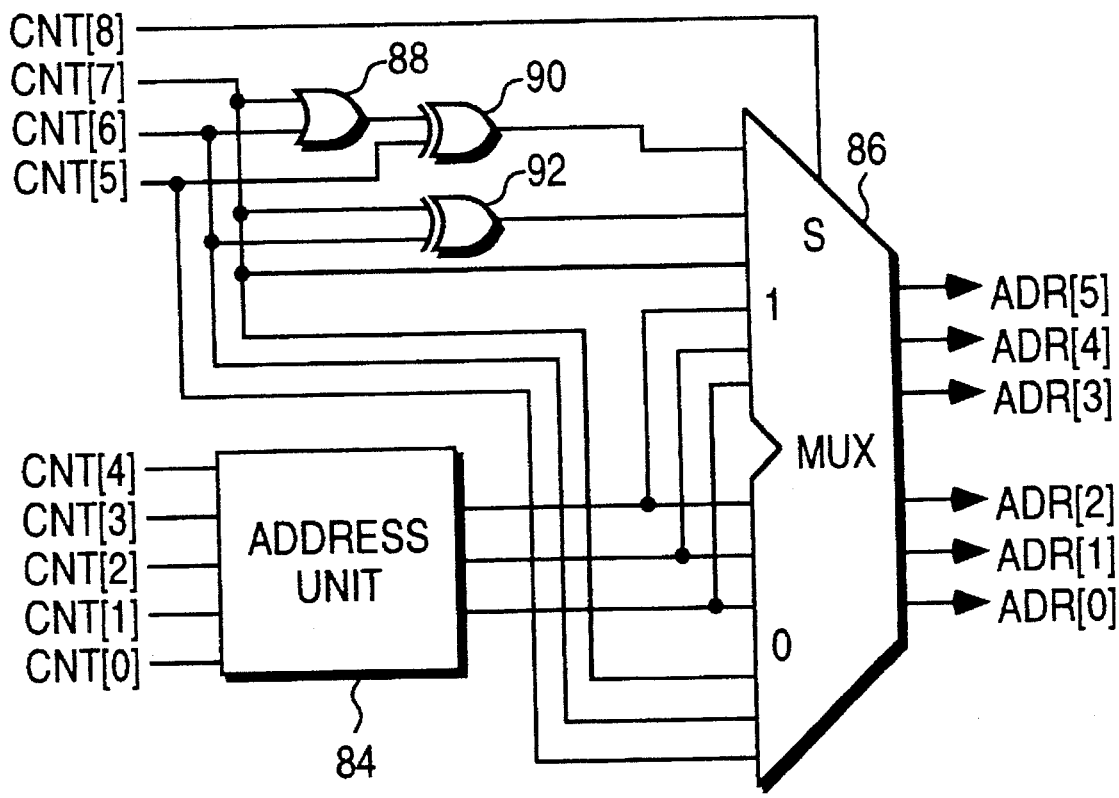
FIG. 4 is a block diagram of the address generation blocks 62 and 70 of FIG. 3.

The first eight matrix column IDCTs are computed column by column, from 0 to 7. Looking at the last eight table rows of Table 3, table columns WRADR and REG3, one can notice the 1D IDCT results are written in a special order. The next eight matrix row IDCTs would use as matrix row addresses (RDADR[5:3] and WRADR[5:3]) this special order and for the matrix column addresses (RDADR[2:0] and WRADR[2:0]) the previous matrix row addresses (transpose operation). This might sound complex, but the address generation is very simple. FIG. 4 shows how it is done.

In FIG. 4, which shows the address generation logic of combinatorial logic blocks 62 and 70 of FIG. 3, CNT[9:0] are a counter output which can be the output of either the read counter 66 or the write counter 58. The address generation logic comprises one OR gate 88, two XOR gates 90 and 92, a multiplexer 86, and an address unit 84. The address unit 84 is a simple combinatorial circuit that generates the three least significant bits of column RDADR or WRADR from Table 3. This takes approximately 180 transistors. The whole IDCT controller, including the two 9 bit counters, takes 674 transistors.

Table 4 shows the number of transistors used for different subsystem blocks of the IDCT. The whole two-dimensional IDCT according to the present invention was implemented using only 1,255 cells gates and flip-flops (approximately 9,000 transistors). This is by far the smallest IDCT (MPEG1 speed) implemented so far.

TABLE 4

| Number of transistors for the IDCT | |
|---|---|
| Block | Number of transistors |
| k coefficients | 204 |
| IDCT controller | 674 |
| MAC | 5366 |
| Round, Shift, Limit | 220 |
| Registers, XOR, buffering | 2726 |
| IDCT total | 9190 |

Figure 5:
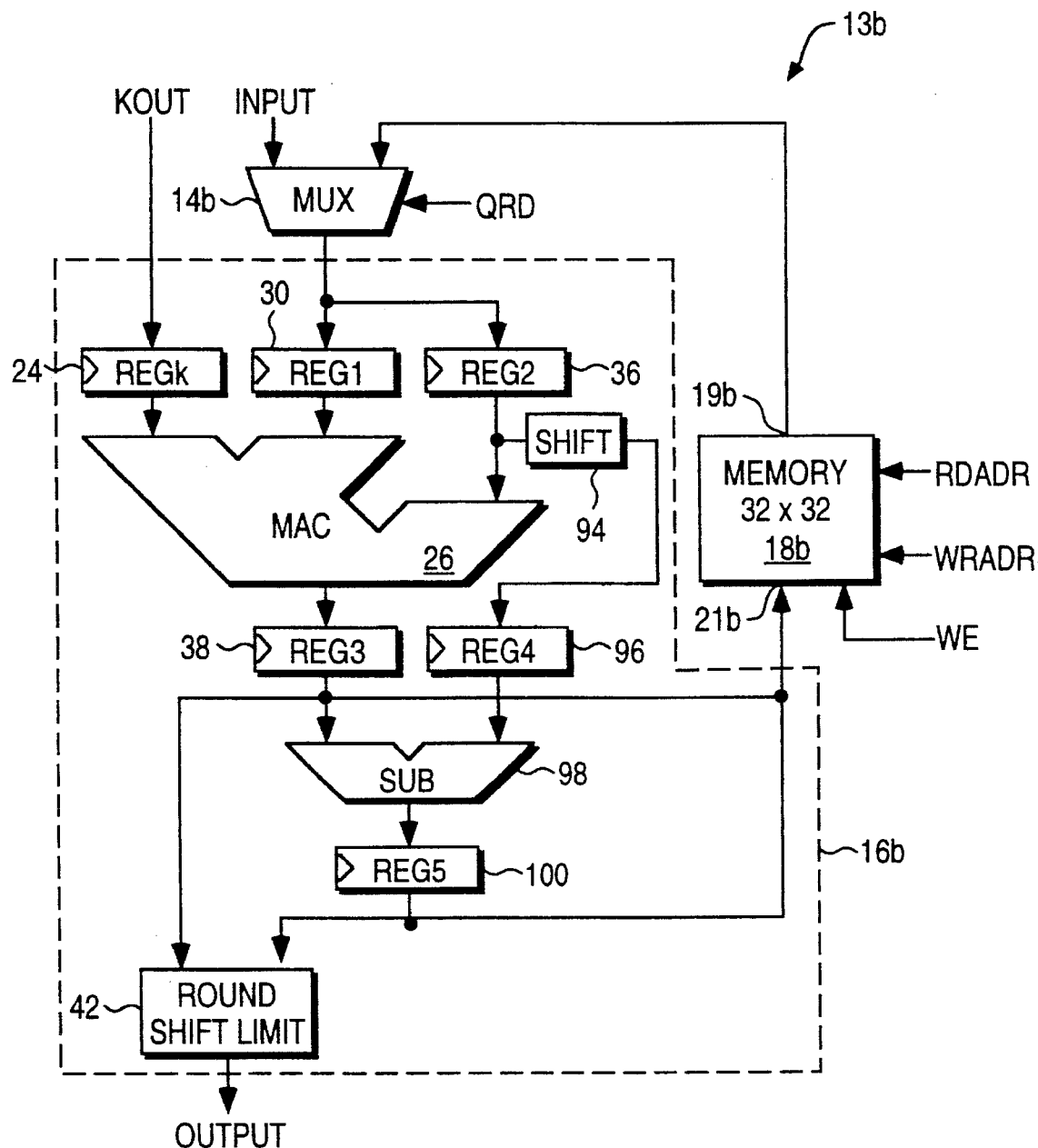
FIG. 5 is a detailed block diagram of a faster system for calculating the IDCT according to the present invention.

For MPGE2 main level resolution (720 by 480×25 frames), there are 243,000 IDCTs to be computed in one second. Assuming a clock speed of 66 MHz, there are approximately 256 cycles available to compute a 2-dimensional IDCT of an 8-by-8 block. This means there is one cycle for computing one butterfly. This can be done in a system 13b with a MAC 26 and a subtractor 98 as shown in FIG. 5, with the controller not shown. The operations to be computed are a+kb and a−kb. The second one can be written as 2a−(a+kb). The term 2a can be obtained by shifting a to the left by one bit.

Because of the different way in which the subtraction is performed, a different embodiment 16b of butterfly calculation subsystem 16 of FIG. 2 is used. The sets of XOR gates 34 and 40 and register 32 (of FIG. 3) are eliminated, and subtractor 98 and registers 96 (REG4) and 100 (REG5) are added. Between the output of register 36 and the input of register 96, the data is left shifted by one bit as indicated by shift block 94. As is well known, this is accomplished by the interconnections and does not require any logic elements. It can be noticed that the IDCT for MPGE2 main level is only slightly bigger than the one for MPEG1. The reason is that in MPEG1 the MAC was greatly underutilised because of the repeated multiplications (the MAC was used nonredundantly only about 50% of the time). The MPGE2 IDCT has an additional 16 bit register and a 16 bit subtractor. The control is almost identical to the previous one and can be easily derived by one skilled in the art from its teaching. The only important difference is the memory 18b, with read port 19b and write port 21b, which is organized now as 32 by 32 instead of 64 by 16, because of the bigger bandwidth. Two data values are now concurrently written to the memory. The intermediate results are read one at a time, with multiplexer 14b selecting which of the two values stored at a memory location is to be read. The total transistor count is approximately 10,000. This is also by far the smallest IDCT (MPGE2 main level speed) ever implemented.

In summary, an apparatus and method for calculation of the inverse discrete cosine transform for image decompression has been described. The apparatus may be implemented with approximately 10,000 transistors for MPGE2 main level speed and with less than 10,000 transistors for MPEG1 main level speed. The implementation has minimal chip area and power consumption requirements so that the resulting decoder can be embedded into any application specific integrated circuit (ASIC).

The present invention has been described in terms of a preferred embodiment. The invention, however, is not limited to the embodiment depicted and described. Rather, the scope of the invention is defined by the appended claims.

What is claimed is:

1. A method for picture decompression, comprising:

(a) inputting a compressed picture definition digital signal;

(b) digitally processing said compressed picture definition digital signal using a signal processor to generate a spatially redundant picture definition digital signal, the processing steps including performing an evaluation of a plurality of 2-dimensional, 8-point-by-8-point inverse discrete cosine transforms, each said evaluation including sixteen evaluations of a scaled eight-point, one-dimensional inverse discrete cosine transform, scaled by a factor equal to the square root of a power of two, followed by a shift of said two-dimensional inverse discrete cosine transform by a number of bits equal to said power of two, said scaled eight-point one-dimensional inverse discrete cosine transform having values f'(0)–f'(7), from discrete cosine transform values F(0)–F(7), said evaluations of a scaled, eight-point, one-dimensional inverse discrete cosine transform including:

(i) calculating an intermediate value $P_0$ equal to about $F(0)+F(4)$;

(ii) calculating an intermediate value $P_1$ equal to about $F(0)-F(4)$;

(iii) calculating an intermediate value $P_2$ equal to about $F(2)+k_1 F(6)$ wherein $k_1$ is about $2^{1/2}-1$;

(iv) calculating an intermediate value $P_3$ equal to about $F(2)-k_2 F(6)$ wherein $k_2$ is about $2^{1/2}+1$;

(v) calculating an intermediate value $P_4$ equal to about $F(1)+k_3 F(7)$ wherein $k_3$ is about $2^{1/2}(2+2^{1/2})^{1/2}-2^{1/2}-1$;

(vi) calculating an intermediate value $P_5$ equal to about $F(1)-k_4 F(7)$ wherein $k_4$ is about $2^{1/2}(2+2^{1/2})^{1/2}+2^{1/2}+1$;

(vii) calculating an intermediate value $P_6$ equal to about $F(5)+k_5 F(3)$ wherein $k_5$ is about $2^{1/2}(2-2^{1/2})^{1/2}+2^{1/2}-1$;

(viii) calculating an intermediate value $P_7$ equal to about $F(5)-k_6 F(3)$ wherein $k_6$ is about $2^{1/2}(2-2^{1/2})^{1/2}-2^{1/2}+1$;

(ix) after said intermediate values $P_0$ and $P_2$ become available, calculating an intermediate value $Q_0$ equal to about $P_0+k_7 P_2$ wherein $k_7$ is about $2^{-1/2}(2+2^{1/2})^{1/2}$;

(x) after said intermediate values $P_0$ and $P_2$ become available, calculating an intermediate value $Q_2$ equal to about $P_0-k_7 P_2$;

(xi) after said intermediate values $P_1$ and $P_3$ become available, calculating an intermediate value $Q_1$ equal to about $P_1+k_8 P_3$ wherein $k_8$ is about $2^{-1/2}(2-2^{1/2})^{1/2}$;

(xii) after said intermediate values $P_1$ and $P_3$ become available, calculating an intermediate value $Q_3$ equal to about $P_1-k_8 P_3$;

(xiii) after said intermediate values $P_4$ and $P_6$ become available, calculating an intermediate value $Q_4$ equal to about $P_4+k_9 P_6$ wherein $k_9$ is about $-(2+2^{1/2})^{1/2}+2^{1/2}+1$;

(xiv) after said intermediate values $P_4$ and $P_6$ become available, calculating an intermediate value $Q_6$ equal to about $P_4-k_9P_6$;

(xv) after said intermediate values $P_5$ and $P_7$ become available, calculating an intermediate value $Q_5$ equal to about $P_5+k_{10}P_7$ wherein $k_{10}$ is about $(2+2^{1/2})^{1/2}+2^{1/2}+1$;

(xvi) after said intermediate values $P_5$ and $P_7$ become available, calculating an intermediate value $Q_7$ equal to about $P_5-k_{10}P_7$;

(xvii) after said intermediate values $Q_6$ and $Q_7$ become available, calculating an intermediate value $R_6$ equal to about $Q_6+k_3Q_7$;

(xviii) after said intermediate values $Q_6$ and $Q_7$ become available, calculating an intermediate value $R_7$ equal to about $Q_6-k_3Q_7$;

(xix) after said intermediate values $Q_0$ and $Q_4$ become available, calculating said value f'(0) equal to about $Q_0+k_{11}Q_4$ wherein $k_{11}$ is about $2^{-1/2}(2+(2+2^{1/2})^{1/2})^{1/2}$;

(xx) after said intermediate values $Q_0$ and $Q_4$ become available, calculating said value f'(7) equal to about $Q_0-k_{11}Q_4$;

(xxi) after said intermediate values $Q_1$ and $R_6$ become available, calculating said value f'(1) equal to about $Q_1+k_{12}R_6$ wherein $k_{12}$ is about $(1/2)(2+(2+2^{1/2})^{1/2})^{1/2}$;

(xxii) after said intermediate values $Q_1$ and $R_6$ become available, calculating said value f'(6) equal to about $Q_1-k_{12}R_6$;

(xxiii) after said intermediate values $Q_2$ and $Q_5$ become available, calculating said value f'(3) equal to about $Q_2+k_{13}Q_5$ wherein $k_{13}$ is about $2^{-1/2}(2-(2+2^{1/2})^{1/2})^{1/2}$;

(xxiv) after said intermediate values $Q_2$ and $Q_5$ become available, calculating said value f'(4) equal to about $Q_2-k_{13}Q_5$;

(xxv) after said intermediate values $Q_3$ and $R_7$ become available, calculating said value f'(2) equal to about $Q_3+k_{12}R_7$; and (xxvi) after said intermediate values $Q_3$ and $R_7$ become available, calculating said value f'(5) equal to about $Q_3-k_{12}R_7$; and (c) outputting said spatially redundant picture definition digital signal for use in rendering a display.

2. The method of claim 1 wherein:

steps (i) and (ii) are performed concurrently;

steps (ix) and (x) are performed concurrently;

steps (xi) and (xii) are performed concurrently;

steps (xiii) and (xiv) are performed concurrently;

steps (xv) and (xvi) are performed concurrently;

steps (xvii) and (xviii) are performed concurrently;

steps (xix) and (xx) are performed concurrently;

steps (xxi) and (xxii) are performed concurrently;

steps (xxiii) and (xxiv) are performed concurrently; and steps (xxv) and (xxvi) are performed concurrently.

3. The method of claim 1 or 2 wherein said intermediate results are not used until at least three cycles after said intermediate results are computed.

4. The method of claim 1 or 2 wherein for each one of eight of said one-dimensional inverse discrete cosine transforms, eight memory locations are used to hold said discrete cosine transform values F(0)–F(7) and said intermediate results.

5. The method of claim 1 or 2 wherein for each one of eight of said one-dimensional inverse discrete cosine transforms, eight memory locations are used to hold said intermediate results and said inverse discrete cosine transform values f'(0)–f'(7).

6. The method of claim 1 wherein two sets of XOR gates are used to determine whether an addition or a subtraction is being done.

7. The method of claim 3 wherein:

step (vii) is executed after step (i);

step (v) is executed after step (vii);

step (iii) is executed after step (v);

step (xiii) is executed after step (iii);

step (xv) is executed after step (xiii);

step (ix) is executed after step (xv);

step (xi) is executed after step (ix);

step (xvii) is executed after step (xi);

step (xix) is executed after step (xvii);

step (xxi) is executed after step (xix);

step (xxv) is executed after step (xxi); and step (xxiii) is executed after step (xxv).

8. The method of claim 4 wherein for each one of eight of said one-dimensional inverse discrete cosine transforms, eight memory locations are used to hold said intermediate results and said inverse discrete cosine transform values f'(0)–f'(7).

9. An apparatus comprising:

a butterfly computation subsystem having a first butterfly computation subsystem input, a second butterfly computation subsystem input, and a butterfly computation subsystem output;

a memory having a write port and a read port;

a first signal path from the butterfly computation subsystem output to the write port of said memory;

a multiplexer having first and second multiplexer inputs and a multiplexer output;

a second signal path from the multiplexer output to the first butterfly computation subsystem input;

a third signal path from the read port of said memory to the first multiplexer input; and a controller for providing read and write addresses and a write enable signal to said memory, and for controlling said multiplexer and for providing coefficients to the second butterfly computation subsystem input in order to compute a 2-dimensional, 8-point-by-8-point inverse discrete cosine transform including sixteen evaluations of a scaled eight-point, one-dimensional inverse discrete cosine transform, scaled by a factor equal to the square root of a power of two, said scaled eight-point, one-dimensional inverse discrete cosine transform having values f'(0)–f'(7), from discrete cosine transform values F(0)–F(7), said controller performing said evaluations as follows:

(i) calculating an intermediate value $P_0$ equal to about F(0)+F(4);

(ii) calculating an intermediate value $P_1$ equal to about F(0)–F(4);

(iii) calculating an intermediate value $P_2$ equal to about $F(2)+k_1F(6)$ wherein $k_1$ is about $2^{1/2}-1$;

(iv) calculating an intermediate value $P_3$ equal to about $F(2)-k_2F(6)$ wherein $k_2$ is about $2^{1/2}+1$;

(v) calculating an intermediate value $P_4$ equal to about $F(1)+k_3F(7)$ wherein $k_3$ is about $2^{1/2}(2+2^{1/2})^{1/2}-2^{1/2}-1$;

(vi) calculating an intermediate value $P_5$ equal to about $F(1)-k_4F(7)$ wherein $k_4$ is about $2^{1/2}(2+2^{1/2})^{1/2}+2^{1/2}+1$;

(vii) calculating an intermediate value $P_6$ equal to about $F(5)+k_5F(3)$ wherein $k_5$ is about $2^{1/2}(2-2^{1/2})^{1/2}+2^{1/2}-1$;

(viii) calculating an intermediate value $P_7$ equal to about $F(5)-k_6F(3)$ wherein $k_6$ is about $2^{1/2}(2-2^{1/2})^{1/2}-2\frac{1}{2}+1$;

(ix) after said intermediate values $P_0$ and $P_2$ become available, calculating an intermediate value $Q_0$ equal to about $P_0+k_7P_2$ wherein $k_7$ is about $2^{-1/2}(2+2^{1/2})^{1/2}$;

(x) after said intermediate values $P_0$ and $P_2$ become available, calculating an intermediate value $Q_2$ equal to about $P_0-k_7P_2$;

(xi) after said intermediate values $P_1$ and $P_3$ become available, calculating an intermediate value $Q_1$ equal to about $P_1+k_8P_3$ wherein $k_8$ is about $2^{-1/2}(2-2^{1/2})^{1/2}$;

(xii) after said intermediate values $P_1$ and $P_3$ become available, calculating an intermediate value $Q_3$ equal to about $P_1-k_8P_3$;

(xiii) after said intermediate values $P_4$ and $P_6$ become available, calculating an intermediate value $Q_4$ equal to about $P_4+k_9P_6$ wherein $k_9$ is about $-(2+2^{1/2})^{1/2}+2^{1/2}+1$;

(xiv) after said intermediate values $P_4$ and $P_6$ become available, calculating an intermediate value $Q_6$ equal to about $P_4-k_9P_6$;

(xv) after said intermediate values $P_5$ and $P_7$ become available, calculating an intermediate value $Q_5$ equal to about $P_5+k_{10}P_7$ wherein $k_{10}$ is about $(2+2^{1/2})^{1/2}+2^{1/2}+1$;

(xvi) after said intermediate values $P_5$ and $P_7$ become available, calculating an intermediate value $Q_7$ equal to about $P_5-k_{10}P_7$;

(xvii) after said intermediate values $Q_6$ and $Q_7$ become available, calculating an intermediate value $R_6$ equal to about $Q_6+k_3Q_7$;

(xviii) after said intermediate values $Q_6$ and $Q_7$ become available, calculating an intermediate value $R_7$ equal to about $Q_6-k_3Q_7$;

(xix) after said intermediate values $Q_0$ and $Q_4$ become available, calculating said value $f'(0)$ equal to about $Q_0+k_{11}Q_4$ wherein $k_{11}$ is about $2^{-1/2}(2+(2+2^{1/2})^{1/2})^{1/2}$;

(xx) after said intermediate values $Q_0$ and $Q_4$ become available, calculating said value $f'(7)$ equal to about $Q_0-k_{11}Q_4$;

(xxi) after said intermediate values $Q_1$ and $R_6$ become available, calculating said value $f'(1)$ equal to about $Q_1+k_{12}R_6$ wherein $k_{12}$ is about $(\frac{1}{2})(2+(2+2^{1/2})^{1/2})^{1/2}$;

(xxii) after said intermediate values $Q_1$ and $R_6$ become available, calculating said value $f'(6)$ equal to about $Q_1-k_{12}R_6$;

(xxiii) after said intermediate values $Q_2$ and $Q_5$ become available, calculating said value $f'(3)$ equal to about $Q_2+k_{13}Q_5$ wherein $k_{13}$ is about $2^{-1/2}(2-(2+2^{1/2})^{1/2})^{1/2}$;

(xxiv) after said intermediate values $Q_2$ and $Q_5$ become available, calculating said value $f'(4)$ equal to about $Q_2-k_{13}Q_5$;

(xxv) after said intermediate values $Q_3$ and $R_7$ become available, calculating said value $f'(2)$ equal to about $Q_3+k_{12}R_7$; and (xxvi) after said intermediate values $Q_3$ and $R_7$ become available, calculating said value $f'(5)$ equal to about $Q_3-k_{12}R_7$.

10. An apparatus comprising:

a multiply accumulate having a first multiplier input, a second multiplier input, an adder input, and a multiply accumulate output;

a memory having a write port and a read port;

a first signal path from the multiply accumulate output to the write port of said memory;

a multiplexer having first and second multiplexer inputs and a multiplexer output;

a second signal path from the multiplexer output to the first multiplier input of said multiply accumulate;

a third signal path from the multiplexer output of said multiplexer to the adder input of said multiply accumulate;

a fourth signal path from the read port of said memory to the first multiplexer input; and a controller for providing read and write addresses and a write enable signal to said memory, and for controlling said multiplexer and including a coefficient block having an output connected to the second multiplier input of said multiply accumulate, in order to compute a 2-dimensional, 8-point-by-8-point inverse discrete cosine transform including sixteen evaluations of a scaled eight-point, one-dimensional inverse discrete cosine transform, scaled by a factor equal to the square root of a power of two, said scaled eight-point, one-dimensional inverse discrete cosine transform having values $f'(0)-f'(7)$, from discrete cosine transform values $F(0)-F(7)$, said controller performing said evaluations as follows:

(i) calculating an intermediate value $P_0$ equal to about $F(0)+F(4)$;

(ii) calculating an intermediate value $P_1$ equal to about $F(0)-F(4)$;

(iii) calculating an intermediate value $P_2$ equal to about $F(2)+k_1F(6)$ wherein $k_1$ is about $2^{1/2}-1$;

(iv) calculating an intermediate value $P_3$ equal to about $F(2)-k_2F(6)$ wherein $k_2$ is about $2^{1/2}+1$;

(v) calculating an intermediate value $P_4$ equal to about $F(1)+k_3F(7)$ wherein $k_3$ is about $2^{1/2}(2+2^{1/2})^{1/2}-2^{1/2}-1$;

(vi) calculating an intermediate value $P_5$ equal to about $F(1)-k_4F(7)$ wherein $k_4$ is about $2^{1/2}(2+2^{1/2})^{1/2}+2^{1/2}+1$;

(vii) calculating an intermediate value $P_6$ equal to about $F(5)+k_5F(3)$ wherein $k_5$ is about $2^{1/2}(2-2^{1/2})^{1/2}+2^{1/2}-1$;

(viii) calculating an intermediate value $P_7$ equal to about $F(5)-k_6F(3)$ wherein $k_6$ is about $2^{1/2}(2-2^{1/2})^{1/2}-2^{1/2}1+1$;

(ix) after said intermediate values $P_0$ and $P_2$ become available, calculating an intermediate value $Q_0$ equal to about $P_0+k_7P_2$ wherein $k_7$ is about $2^{-1/2}(2+2^{1/2})^{1/2}$;

(x) after said intermediate values $P_0$ and $P_2$ become available, calculating an intermediate value $Q_2$ equal to about $P_0-k_7P_2$;

(xi) after said intermediate values $P_1$ and $P_3$ become available, calculating an intermediate value $Q_1$ equal to about $P_1+k_8P_3$ wherein $k_8$ is about $2^{-1/2}(2-2^{1/2})^{1/2}$;

(xii) after said intermediate values $P_1$ and $P_3$ become available, calculating an intermediate value $Q_3$ equal to about $P_1-k_8P_3$;

(xiii) after said intermediate values $P_4$ and $P_6$ become available, calculating an intermediate value $Q_4$ equal to about $P_4+k_9P_6$ wherein $k_9$ is about $-(2+2^{1/2})^{1/2}+2^{1/2}+1$;

(xiv) after said intermediate values $P_4$ and $P_6$ become available, calculating an intermediate value $Q_6$ equal to about $P_4-k_9P_6$;

(xv) after said intermediate values $P_5$ and $P_7$ become available, calculating an intermediate value $Q_5$ equal to about $P_5+k_{10}P_7$ wherein $k_{10}$ is about $(2+2^{1/2})^{1/2}+2^{1/2}+1$;

(xvi) after said intermediate values $P_5$ and $P_7$ become available, calculating an intermediate value $Q_7$ equal to about $P_5-k_{10}P_7$;

(xvii) after said intermediate values $Q_6$ and $Q_7$ become available, calculating an intermediate value $R_6$ equal to about $Q_6+k_3Q_7$;

(xviii) after said intermediate values $Q_6$ and $Q_7$ become available, calculating an intermediate value $R_7$ equal to about $Q_6-k_3Q_7$;

(xix) after said intermediate values $Q_0$ and $Q_4$ become available, calculating said value f'(0) equal to about $Q_0+k_{11}Q_4$ wherein $k_{11}$ is about $2^{-1/2}(2+(2+2^{1/2})^{1/2})^{1/2}$;

(xx) after said intermediate values $Q_0$ and $Q_4$ become available, calculating said value f'(7) equal to about $Q_0-k_{11}Q_4$;

(xxi) after said intermediate values $Q_1$ and $R_6$ become available, calculating said value f'(1) equal to about $Q_1+k_{12}R_6$ wherein $k_{12}$ is about $(1/2)(2+(2+2^{1/2})^{1/2})^{1/2}$;

(xxii) after said intermediate values $Q_1$ and $R_6$ become available, calculating said value f'(6) equal to about $Q_1-k_{12}R_6$;

(xxiii) after said intermediate values $Q_2$ and $Q_5$ become available, calculating said value f'(3) equal to about $Q_2+k_{13}Q_5$ wherein $k_{13}$ is about $2^{-1/2}(2-(2+2^{1/2})^{1/2})^{1/2}$;

(xxiv) after said intermediate values $Q_2$ and $Q_5$ become available, calculating said value f'(4) equal to about $Q_2-k_{13}Q_5$;

(xxv) after said intermediate values $Q_3$ and $R_7$ become available, calculating said value f'(2) equal to about $Q_3+k_{12}R_7$; and (xxvi) after said intermediate values $Q_3$ and $R_7$ become available, calculating said value f'(5) equal to about $Q_3-k_{12}R_7$.

11. The apparatus of claim 10 wherein:

steps (i) and (ii) are performed concurrently;

steps (ix) and (x) are performed concurrently;

steps (xi) and (xii) are performed concurrently;

steps (xiii) and (xiv) are performed concurrently;

steps (xv) and (xvi) are performed concurrently;

steps (xvii) and (xviii) are performed concurrently;

steps (xix) and (xx) are performed concurrently;

steps (xxi) and (xxii) are performed concurrently;

steps (xxiii) and (xxiv) are performed concurrently; and steps (xxv) and (xxvi) are performed concurrently.

12. The apparatus of claim 10 or 11 wherein said intermediate results are not used until at least three cycles after said intermediate results are computed.

13. The apparatus of claim 10 or 11 wherein for each one of eight of said one-dimensional inverse discrete cosine transforms, eight memory locations are used to hold said discrete cosine transform values F(0)–F(7) and said intermediate results.

14. The apparatus of claim 10 or 11 wherein for each one of eight of said one-dimensional inverse discrete cosine transforms, eight memory locations are used to hold said intermediate results and said inverse discrete cosine transform values f'(0)–f'(7).

15. The apparatus of claim 10 wherein said first and third signal paths include sets of XOR gates for complementing, a signal passing through said signal paths, each XOR gate having an input connected to said controller.

16. The apparatus of claim 12 wherein:

step (vii) is executed after step (i);

step (v) is executed after step (vii);

step (iii) is executed after step (v);

step (xiii) is executed after step (iii);

step (xv) is executed after step (xiii);

step (ix) is executed after step (xv);

step (xi) is executed after step (ix);

step (xvii) is executed after step (xi);

step (xix) is executed after step (xvii);

step (xxi) is executed after step (xix);

step (xxv) is executed after step (xxi); and step (xxiii) is executed after step (xxv).

17. The apparatus of claim 11 wherein said first signal path includes a subtractor having an input connected to said third signal path.

18. The apparatus of claim 10 wherein said controller includes a read counter and a write counter, said memory read address being a combinatorial function of an output of said read counter, and said memory write address being a combinatorial function of an output of said write counter.

19. The apparatus of claim 18 wherein said combinatorial function of an output of said read counter and said combinatorial function of an output of said write counter are the same.

20. The apparatus of claim 18 wherein said read counter is three counts ahead of said write counter while both said read counter and said write counter are counting.

21. The apparatus of claim 18 wherein said coefficient block is connected to said read counter and is not connected to said write counter.

22. The apparatus of claim 13 wherein for each one of eight of said one-dimensional inverse discrete cosine transforms, eight memory locations are used to hold said intermediate results and said inverse discrete cosine transform values f'(0)–f'(7).

* * * * *